July 3, 1956        A. TANGEN        2,752,795

GOVERNOR ARRANGEMENT FOR POWER TAKE-OFF MECHANISM

Filed Oct. 24, 1952        2 Sheets-Sheet 1

INVENTOR.
ANTHONY TANGEN
BY
ATTORNEYS

July 3, 1956
A. TANGEN
2,752,795
GOVERNOR ARRANGEMENT FOR POWER TAKE-OFF MECHANISM
Filed Oct. 24, 1952
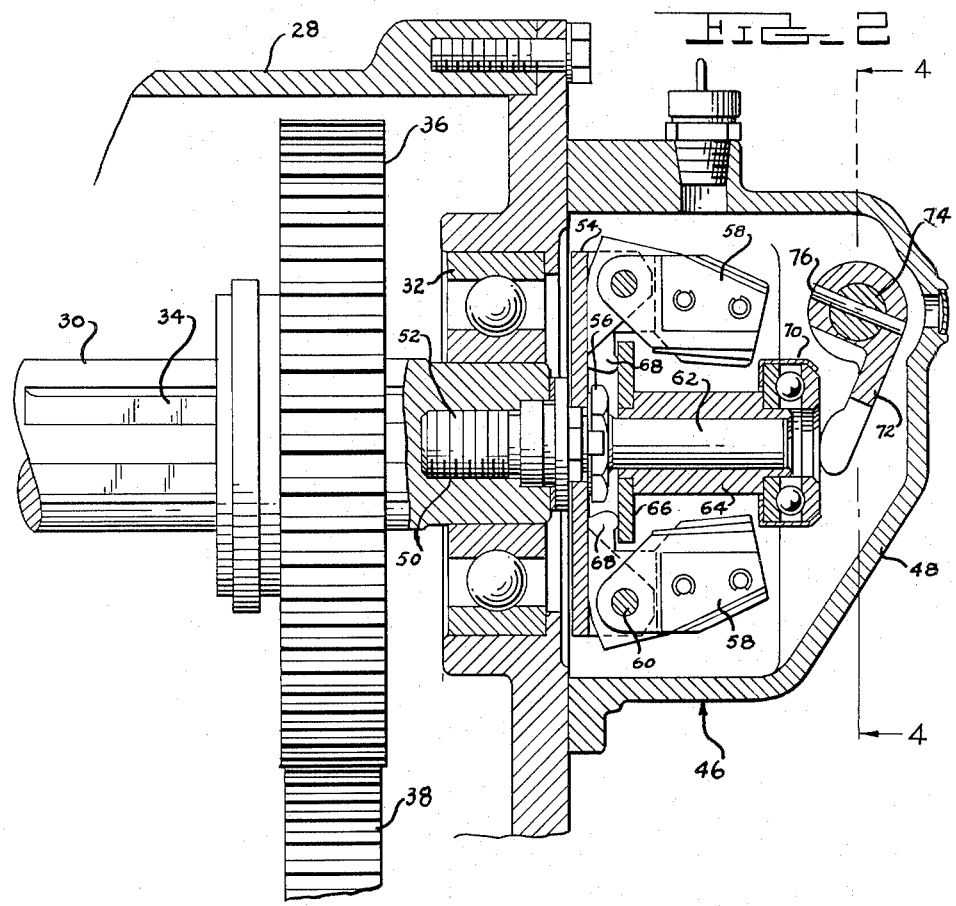
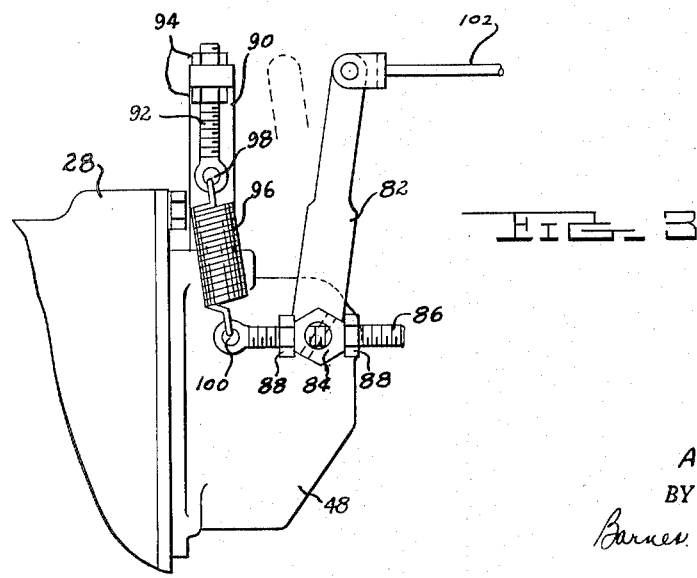
INVENTOR.
ANTHONY TANGEN
BY
Barnes, Kissell, Laughlin & Raisch
ATTORNEYS

United States Patent Office 2,752,795
Patented July 3, 1956

2,752,795

GOVERNOR ARRANGEMENT FOR POWER TAKE-OFF MECHANISM

Anthony Tangen, Detroit, Mich.

Application October 24, 1952, Serial No. 316,582

2 Claims. (Cl. 74—15.86)

This invention relates to a governor arrangement for a power take-off mechanism or more particularly to a means for accurately controlling the speed of a device driven by a power take-off from an internal combustion engine of a motor vehicle.

It is an object of this invention to provide a governor arrangement for very accurately controlling the speed of a device in the form of a rotating load on the vehicle driven through a power take-off from an internal combustion engine which propels the vehicle.

More specifically, the invention has to do with the provision of an arrangement wherein the engine is directly responsive to the speed of the device being driven and the governor is arranged to by-pass the lost-motion connections or drives between the engine and the device driven thereby through the power take-off.

In the drawings:

Fig. 2 is a fragmentary sectional view through the power take-off device and the governor.

Fig. 3 is a fragmentary side elevation of the power take-off device and governor.

Figure 1:
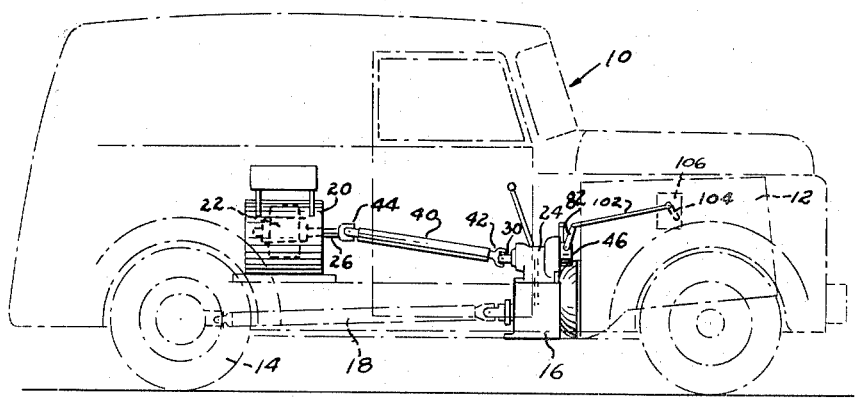
Fig. 1 is a somewhat diagrammatic view showing a motor vehicle provided with the governor and power take-off arrangement of this invention.

The invention here is applicable in various types of power take-off arrangements wherein it is desired to control very accurately the speed of a device driven by an internal combustion engine. For the purposes of illustration, the arrangement is shown and will be described in connection with a motor vehicle such as shown at 10 provided with an internal combustion engine 12. The engine 12 is arranged to drive the rear wheels 14 of the vehicle through a transmission 16 and a main drive shaft 18. In the illustrated arrangement there is mounted on the vehicle 10 an electric current generator 20 having an armature 22 which is arranged to be rotated by means of the engine 12 through a power take-off device 24 connected to the shaft 26 on which the armature 22 is mounted.

Power take-off 24 is of the type disclosed in my U. S. Patent No. 2,313,679. Although the arrangement herein described is admirably adapted for use with the power take-off device disclosed in said Patent 2,313,679, the arrangement may employ a power take-off device of different construction. A detail description of the power take-off device is therefore believed to be unnecessary.

It will suffice to say that the power take-off device 24 includes a housing 28 which is mounted directly on the housing of transmission 16. Within housing 28 there is supported a main drive shaft 30 which is supported for rotation as by a bearing 32. At its forward end shaft 30 is fashioned with splines 34 and supports a gear 36 which has a driving connection with a gear 38 of transmission 16. Means (not shown) are provided for shifting gear 36 along the splines 34 into and out of driving relation with gear 38. A shaft 40 connects at one end with the rear end of shaft 30 as by a universal joint 42, and at its opposite end shaft 40 connects with shaft 26 as by a universal joint 44. Universal joints such as shown at 42 and 44 are of standard construction and are arranged to transmit torque from one member to another with substantially no rotative lost motion. In other words, in the arrangement illustrated, there will be no lost motion between shaft 30 and shaft 26.

Figure 4:
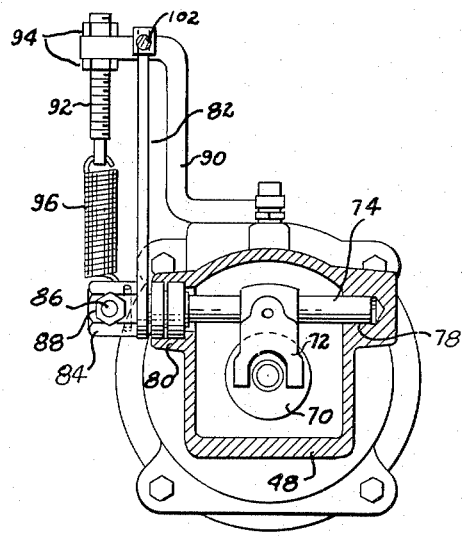
Fig. 4 is a sectional view taken along the line 4—4 in Fig. 2.

At the front end of housing 28 there is supported a governor generally designated 46. Governor 46 includes a housing 48 which is bolted or otherwise supported on the front face of housing 28. The forward end of shaft 30 is provided with a threaded bore 50 in which a stub shaft 52 is arranged to be threadedly engaged. Shaft 52 projects into housing 48. A plate 54 is clamped on shaft 52 as by a clamping nut 56. Plate 54 is fixed with respect to shaft 52 and rotates therewith. A pair of diametrically opposed weights 58 is pivotally supported on plate 54 as at 60. On the forward end portion 62 of shaft 52 there is slidably supported a sleeve 64 having a face plate 66 at its rear end which is adapted to be engaged by the finger portions 68 of the pivoted weights 58. At its forward end sleeve 64 supports a thrust bearing 70, the front face of which is engaged by the fingers of a yoke 72 which is keyed to a shaft 74 as by a pin 76. Shaft 74 is pivotally supported at each end within sockets formed in housing 48 such as indicated at 78 and 80 (Fig. 4). At its outer end shaft 74 supports an arm 82. Arm 82 is fixed on shaft 74 as by means of a nut 84. A threaded pin 86 extends transversely through nut 84 and is adapted to be adjusted axially in a direction transversely of shaft 74 by means of a pair of lock nuts 88.

A bracket 90 is fixed on housing 48 and is arranged to receive a threaded pin 92 which is adjustable vertically on bracket 90 by means of a pair of lock nuts 94. A coil tension spring 96 has one end connected with pin 92 as at 98 and has its other end connected with pin 86 as at 100. The upper end of arm 82 is connected as by a non-yielding link 102 with the throttle lever 104 on the carburetor 106 of engine 12.

It will be observed that, with the arrangement above described, the speed of armature 22 can be very accurately controlled. As pointed out above, there is a negligible amount of lost motion from the standpoint of torque between shaft 30 and shaft 26 on which the armature 22 is fixedly mounted. Thus, the governor 46 is responsive directly to the speed of armature 22. In the arrangement illustrated, if it should happen that the speed of armature 22 momentarily exceeds the governed speed, shaft 30 will at the same instant exceed the governed speed by the same amount and the weights 58 will pivot outwardly thereby shifting sleeve 64 forwardly. This causes arm 82 to be rotated in a counterclockwise direction as viewed in Figs. 1, 2 and 3 to the broken line position shown in Fig. 3. Therefore, as soon as the armature 22 overspeeds, link 102 will be immediately actuated to move the throttle lever 104 in the closing direction thereby affecting an immediate decrease in speed of the engine. I have found that this arrangement completely eliminates surging which is so common and which I believe is caused by the lost motion between a rotating load and the remotely positioned drive member on which the governor is conventionally mounted.

In my arrangement there is a direct drive, with no lost motion, between the load being driven and the governor. Therefore the governor is immediately responsive to a change in speed of the load to effect a necessary change in engine speed to maintain the governed speed of the load.

In many instances where work performing mechanisms, such as electrical generators, are mounted on motor vehicles, the engine of which drives the mechanism through a power take-off, an extremely accurate controlling of the speed of the work mechanism is very important. In the arrangement shown, for example, it may be desired to control the current from the generator within very close limits. If the governor were mounted, say, for example, such as to be driven by the transmission rather than the main drive shaft of the power take-off, or the load shaft itself, the control of the current from the generator would not be nearly as accurate as in the arrangement shown. The reason for this is that, when torque is transmitted through a drive such as a gear train, there is bound to be an appreciable amount of lost motion. Therefore in order to accurately control the speed of the work mechanism, such as the rotating armature 22, it is necessary that the governor be mounted directly on the shaft which drives the armature. If the governor were mounted such as to be driven by a shaft connected with the load (armature 22) through a gear train, then the governor would not be responsive to the speed of the load within very close limits of operation.

My governor arrangement is also very sensitive in that the governor speed can be adjusted very accurately by reason of the arrangement of the spring 96 together with the adjusting pins 86 and 92. The governed speed may be initially adjusted by means of clamping nuts 94. This affects an initial adjustment of the tension in spring 96. Thereafter, to obtain a fine adjustment clamping nuts 88 are adjusted to control the lever arm between the axis of shaft 74 and the axis of spring 96. It will be appreciated that, by reason of these two adjustments, the degree to which the outward movement of weights 58 is resisted can be controlled very accurately, and thus the governed speed is likewise adjusted to within very accurate limits.

It will also be observed that when the power take-off is coupled from the transmission the speed of the engine is not controlled by the governor. Thus, the vehicle can be propelled at any desired speed.

I claim:

1. In combination, an internal combustion engine having a drive shaft, an accessory work performing mechanism independent of said engine, a power take-off for driving said work performing mechanism from said engine, means forming a driving connection between said engine and said power take-off, means shiftable between two positions to establish and disestablish said driving connection, said work performing mechanism having a rotatable member, the speed of which is desired to be controlled very accurately, said power take-off mechanism having a main drive shaft, said drive shaft having a direct driving connection with said rotatable member, said last mentioned driving connection being of the type wherein the degree of rotative lost motion between said main drive shaft of said power take-off and said rotatable member is infinitesimal, means for controlling the speed of the rotatable member comprising a speed controlling governor of the centrifugal type mounted directly on said drive shaft of the power take-off and a substantially non-yielding connection between said governor and the throttle of said internal combustion engine.

2. In combination, an internal combustion engine having a drive shaft, an accessory work performing mechanism independent of said engine, a power take-off for driving said work performing mechanism from said engine, means including a gear train providing a driving connection between the drive shafts of said engine and said power take-off mechanism, means shiftable between two positions to establish and disestablish said gear train connection, said work performing mechanism including a rotatable member comprising a load, the speed of which is desired to be controlled very accurately, a drive shaft having a direct driving connection with said rotatable member, means providing a direct driving connection between the drive shafts of said power take-off mechanism and said accessory work performing mechanism, said last mentioned means being of the type wherein the degree of rotative lost motion between said last two mentioned drive shafts is infinitesimal and means for controlling the speed of said rotatable member comprising a governor of the centrifugal type mounted directly on one of said last two mentioned shafts and a substantially non-yielding connection between the governor and the throttle of the internal combustion engine.

References Cited in the file of this patent

UNITED STATES PATENTS

| | | |
|---|---|---|
| 1,772,247 | Forrester et al. | Aug. 5, 1930 |
| 1,924,228 | Bull | Aug. 29, 1933 |
| 2,213,196 | Bartholomew | Sept. 13, 1940 |
| 2,472,450 | Vleck | June 7, 1949 |